United States Patent
Hansson

[11] Patent Number: 6,034,463
[45] Date of Patent: Mar. 7, 2000

[54] STATOR FOR AN ELECTRIC MACHINE

[75] Inventor: Gunnar Christer Hansson, Stockholm, Sweden

[73] Assignee: Atlas Copco Tools AB, Nacka, Sweden

[21] Appl. No.: 08/845,682

[22] Filed: Apr. 25, 1997

Related U.S. Application Data

[62] Division of application No. 08/374,792, filed as application No. PCT/SE94/00495, May 26, 1994, Pat. No. 5,714,827.

[30] Foreign Application Priority Data

May 26, 1993 [SE] Sweden ................................. 9301804

[51] Int. Cl.[7] ...................................................... H02K 1/12
[52] U.S. Cl. .......................... 310/259; 310/214; 310/215; 310/156; 310/254; 310/179
[58] Field of Search ..................................... 310/214, 215, 310/156, 254, 179, 259, 258; 29/596, 598

[56] References Cited

U.S. PATENT DOCUMENTS

| | | | |
|---|---|---|---|
| 2,701,316 | 2/1955 | Willits et al. | 310/214 |
| 4,679,313 | 7/1987 | Schultz et al. | 29/596 |
| 4,703,211 | 10/1987 | Yazaki et al. | 310/179 |
| 4,852,245 | 8/1989 | Denk | 29/596 |
| 4,868,970 | 9/1989 | Schultz et al. | 29/596 |
| 4,908,347 | 3/1990 | Denk | 505/1 |
| 4,954,739 | 9/1990 | Schultz et al. | 310/156 |
| 5,197,180 | 3/1993 | Mihalko | 29/596 |
| 5,233,252 | 8/1993 | Denk | 310/254 |
| 5,306,976 | 4/1994 | Beckman | 310/215 |
| 5,313,127 | 5/1994 | Danley et al. | 310/36 |
| 5,313,131 | 5/1994 | Hibino et al. | 310/254 |

FOREIGN PATENT DOCUMENTS

| | | | |
|---|---|---|---|
| 0 193 929 | 9/1986 | European Pat. Off. | 310/254 |
| 0 225 132 | 6/1987 | European Pat. Off. | 310/254 |

*Primary Examiner*—Elvin G. Enad
*Attorney, Agent, or Firm*—Frishauf, Holtz, Goodman, Langer & Chick, P.C.

[57] ABSTRACT

A process for fabricating a stator for an electric machine having a tubular unslotted ferromagnetic flux collector ring (16) and stator winding coils (18, 19, 20) with two legs which extend substantially axially along the inner cylindrical surface of the flux collector ring (16). Each winding coil leg is confined within an envelope (22) of a thin, flexible, non-conductive non-magnetizable material which is impregnated with and bonded to the next legs as well as to the flux collector ring (16) by a hot-setting resinous material.

6 Claims, 1 Drawing Sheet

STATOR FOR AN ELECTRIC MACHINE

This is a division of application Ser. No. 08/374,792 filed Apr. 20, 1995 now U.S. Pat. No. 5,714,827 which is a national stage of PCT/SE94/00495 filed May 26, 1994.

BACKGROUND OF THE INVENTION

This invention relates to a stator for an electric machine which includes a tubular unslotted ferromagnetic flux collector ring, and stator windings formed by a number of winding coils associated with the flux collector ring, wherein each of the winding coils has at least two legs which extend substantially axially along the inner cylindrical surface of the flux collector ring.

A problem concerned with previous electric machines of the above type is a relatively small effective space available for the winding coil wires in relation to the total cross sectional area of the windings within the flux collector ring. This means a relatively low efficiency of the machine.

One prior art method for arranging the stator windings inside a flux collector ring is described in EP 0 225 132 and comprises mounting of the winding coils on a support structure of a non-magnetisable, non-conductive material and insertion of the support structure and the windings together into the flux collector ring. In this known machine, the winding support structure takes a lot of space and reduces the effective space available for the winding coil wires.

Another prior art method for building electric machine stators, see for instance EP 0 193 929, comprises the measures of locating the winding legs by their end by using threads or tape, and then introducing them together with a fiberglass sleeve into the flux collector ring and fixing them to the latter by injecting a resin material.

By this known method it is very difficult to obtain an accurate orientation of the winding wires and hence a high density packing of the letters.

Accordingly, the invention is intended to solve the problem of how to accomplish a stator for an electric machine with a maximum effective space available for the winding coil wires in relation to the total cross sectional area of the windings and at the same time obtain an accurate orientation of the winding coil wires inside the flux collector ring.

SUMMARY OF THE INVENTION

According to the present invention, a stator for an electric machine comprises a tubular slotless ferromagnetic flux collector ring (16), the flux collector ring having an inner cylindrical surface; and stator windings (17) including a number of winding coils (18, 19, 20) associated with the flux collector ring (16), each of the winding coils (18, 19, 20) having a number of wires put together in at least two winding legs (18a, b, 19a, b, 20a, b) extending substantially axially along the inner cylindrical surface of the flux collector ring (16). Each of the winding legs (18a, b, 19a, b, 20a, b) is confined in a tube-shaped envelope (22) of a thin, flexible, non-conductive non-magnetizable material which is impregnated and bonded together with the wires in each of the winding legs (18a, b, 19a, b, 20a, 20b) by a hot-setting resinous material. The winding coil legs are fixed and secured to the flux collector ring (16) as well as to one another by bonding with the hot-setting resinous material.

According to another aspect of the invention, a process for installing stator windings in a tubular slotless flux collector ring for an electric machine comprises arranging the windings in the coils, such that each coil has a number of wires put together in at least two legs; enclosing each coil leg in the thin-walled envelope of the thin, flexible, non-conductive non-magnetizable material; inserting all of the coil legs in the flux collector ring in a predetermined pattern; and inserting a mandrel to locate properly the coil legs relative to the flux collector ring. An impregnating and bonding material is applied inside as well as outside each envelope for bonding the respective coil leg to the envelope and for bonding the envelopes to each other and to the flux collector ring, to thereby form the stator.

BRIEF DESCRIPTION OF THE DRAWINGS

A preferred embodiment of the invention is described below in detail with reference to the accompanying drawing.

DETAILED DESCRIPTION

Figure 1:
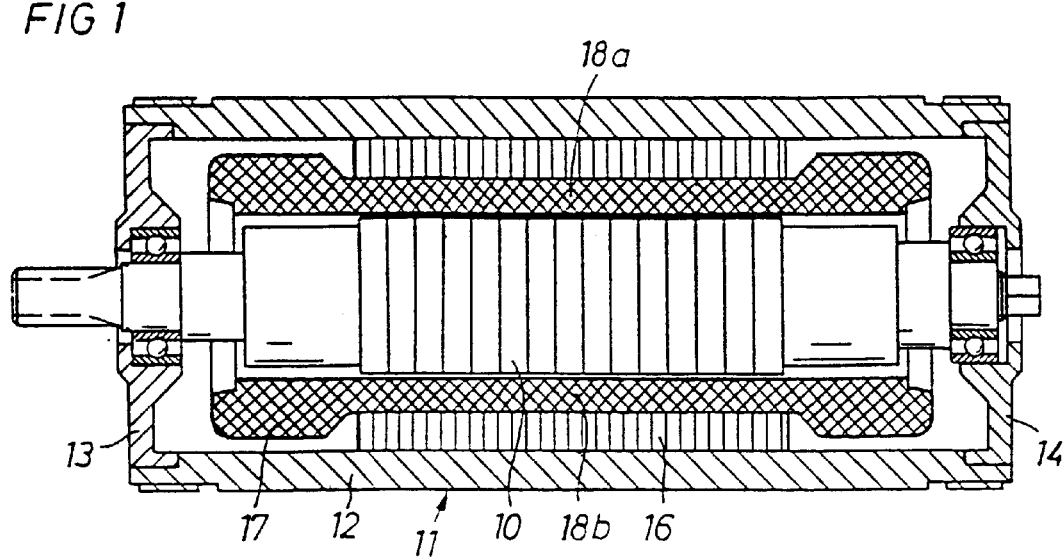
FIG. 1 shows an electric motor incorporating a stator according to the invention.

FIG. 1 shows an electric motor having a laminated permanent magnet rotor 10 rotatively journalled in a housing 11. The housing comprises a tubular trunk portion 12 and two opposite end walls 13, 14.

The stator of the motor comprises a tubular unslotted flux collector ring 16 which is made of a laminated ferromagnetic material, and stator windings 17. The flux collector ring 16 is laminated for reducing eddy current losses.

The stator windings 17 comprise three winding coils 18, 19, 20, each having two substantially straight legs 18a and 18b, 19a and 19b and 20a and 20b, respectively. The legs of each coil are located diametrically opposite each other. See FIG. 2.

Each winding coil leg is enclosed in an envelope 22 (see FIG. 3) of a thin flexible non-magnetizable material. This envelope is tube shaped and formed with an overlapping longitudinal slot 23 for introduction of the winding coil wires into the envelope. As illustrated in the drawing figures, the envelopes 22 encircle the winding coil legs by more than 360°. Preferably, the amount of encircling is about 390° to ensure a safe confinement of the wiring during installation in the flux collector ring 16.

Figure 3:
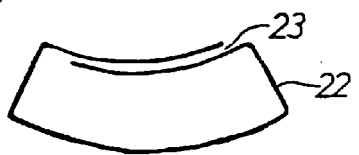
FIG. 3 shows a cross sectional view of a winding coil leg envelope.

Specific mechanical properties are required for the material used in the envelopes such that the winding coil legs may be firmly pressed together radially as well as circumferentially without losing too much of their preformed shape, as illustrated in FIG. 3, as well as their function to align the winding legs. The envelope material must also withstand frictional forces during insertion and compressing of the coil legs. Suitable materials for this purpose are commercially available isolation materials for electric machines etc. like films and fibrous materials or hybrids thereof which easily combine with a suitable impregnating and bonding material. These materials are not only non-conductive they are also stiff enough to maintain pretty well a preformed shaped and are apt to withstand some mechanical stress and wear to protect the wiring during the installation process.

The thickness of the envelope material depends to some extent on the size of the motor and ranges from 0.1 to 0.5 mm. this means that the envelope material occupies just a minor part of the space available for the windings. The radial space available for the windings in small motors may in some cases be as small as 2–3 mm's which means that the thickness of the envelope material is crucial indeed for how much effective copper wire there is room for.

Before the assemblage of the stator, the winding coils 18, 19, 20 are prefabricated and wound to desired length, legs 18*a*, 18*b*, 19*a*, 19*b* and 20*a*, 20*b*, respectively, are wrapped in the envelopes which are prefabricated separately. The coil legs 18, 19, 20 are inserted in the flux collector ring 16 in the desired pattern, illustrated in FIG. 2, and are properly located by means of a cylindrical mandrel introduced between the coil legs. Thereafter, an impregnating and bonding material such as a hot-setting resin is applied inside as well as outside the envelopes 22 to fix and secure the coil legs and wires relative to the flux collector ring 16. This is accomplished by submerging the entire flux collector ring assembly into a bath containing heated resin.

Preferably this bath treatment is carried out in a receptacle subjectable to pulsating pressure below atmospheric pressure. Thereby, the resin penetrates and fills up the entire space left between all copper wires within each of the envelopes and impregnates the envelope material.

After setting, the resin secures the coil legs to the inner wall of the flux collector ring 16 as well as to one another. Thereby, a very compact stator winding is obtained.

Figure 2:
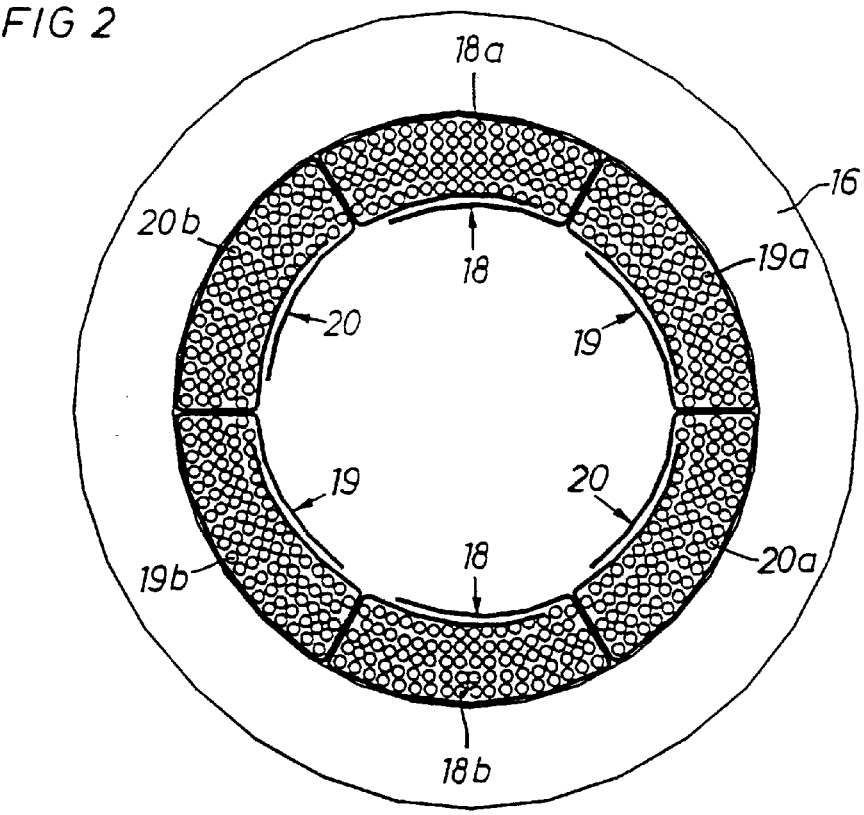
FIG. 2 shows a cross sectional view of a stator according to the invention.

As may be seen in FIG. 2, the coil leg confining envelopes as well as the bonding resin occupies a very small space in relation to the effective wiring, which means that the effective available space for the wiring coil wires is very large in relation to the total space or cross sectional area of the coil windings within the flux collector ring 16. This effective space available for the coil winding wires constitutes more than 80% of the total winding space.

I claim:

1. A process for installing stator windings in a slotless stator for an electric machine, wherein the slotless stator includes a tubular slotless ferromagnetic flux collector ring having an inner cylindrical surface, and wherein the stator windings include a number of winding coils coupled to the flux collector ring, each of the winding coils having a number of wires contained within at least two winding legs, the at least two winding legs of each winding coil extending substantially axially along the inner cylindrical surface of the flux collector ring, comprising the steps of:

arranging the stator windings in the winding coils, such that each winding coil has a number of wires contained within at least two winding legs;

enclosing each winding leg in an envelope made of a thin, flexible, non-conductive non-magnetizable material which substantially maintains the arrangement of the stator windings in the winding coils;

inserting all of the winding legs in the flux collector ring in a predetermined pattern, to form a flux collector ring assembly;

inserting a mandrel to locate properly the winding legs relative to the flux collector ring; and applying an impregnating and bonding material inside as well as outside each said envelope for bonding each said winding leg to its respective envelope and for bonding said envelopes to each other and to the flux collector ring, to thereby form the stator.

2. The process of claim 1, wherein said impregnating and bonding material is a hot-setting resinous material.

3. The process of claim 2, wherein said resinous material is applied by submerging the entire flux collector ring assembly into a bath containing said resinous material, so that said resinous material penetrates into all spaces left between the winding coil wires and the envelopes and between the envelopes and the flux collector ring.

4. The process of claim 3, wherein the collector ring assembly is submerged into the resin bath inside a receptacle at pressure levels below atmospheric pressure.

5. The process of claim 4, wherein the pressure within said receptacle is pulsating.

6. The process of claim 1, wherein the enclosing step comprises providing the envelope which is sufficiently stiff to substantially maintain its preformed shape while firmly pressing together radially as well as circumferentially said winding legs therein.

* * * * *